(12) United States Patent
Ugarte Alba

(10) Patent No.: US 11,433,846 B2
(45) Date of Patent: Sep. 6, 2022

(54) SIDE IMPACT PROTECTION DEVICE

(71) Applicant: Dalphi Metal Espana, S.A., Vigo (ES)

(72) Inventor: Oscar Ugarte Alba, Valladolid (ES)

(73) Assignee: DALPHI METAL ESPANA S.A., Vigo (ES)

( * ) Notice: Subject to any disclaimer, the term of this patent is extended or adjusted under 35 U.S.C. 154(b) by 0 days.

(21) Appl. No.: 16/973,804

(22) PCT Filed: Jun. 18, 2019

(86) PCT No.: PCT/EP2019/066014
§ 371 (c)(1),
(2) Date: Dec. 10, 2020

(87) PCT Pub. No.: WO2019/243332
PCT Pub. Date: Dec. 26, 2019

(65) Prior Publication Data
US 2021/0261084 A1    Aug. 26, 2021

(30) Foreign Application Priority Data
Jun. 22, 2018 (DE) .......................... 102018115064.4

(51) Int. Cl.
*B60R 21/232*  (2011.01)
*B60R 21/213*  (2011.01)
*B60R 21/00*   (2006.01)

(52) U.S. Cl.
CPC .......... *B60R 21/232* (2013.01); *B60R 21/213* (2013.01); *B60R 2021/0009* (2013.01)

(58) Field of Classification Search
CPC .. B60R 2021/0009; B60R 2021/23308; B60R 2021/23316; B60R 2021/23324; B60R 2021/23386; B60R 21/213; B60R 21/214; B60R 21/232; B60R 21/2338
See application file for complete search history.

(56) References Cited

U.S. PATENT DOCUMENTS

| 5,470,103 | A | * | 11/1995 | Vaillancourt | ......... | B60R 21/214 |
| | | | | | | 280/730.1 |
| 6,695,342 | B2 | * | 2/2004 | Tanase | .................. | B60R 21/213 |
| | | | | | | 280/730.2 |
| 6,722,691 | B1 | * | 4/2004 | Haland | ................. | B60R 21/214 |
| | | | | | | 280/730.1 |

(Continued)

FOREIGN PATENT DOCUMENTS

| DE | 102004061898 | 7/2006 |
| EP | 1110825 | 6/2001 |
| EP | 1541426 | 6/2005 |

Primary Examiner — Laura Freedman
(74) Attorney, Agent, or Firm — Tarolli, Sundheim, Covell & Tummino LLP

(57) ABSTRACT

The invention relates to a side impact protection device comprising a side curtain airbag (22), wherein the side curtain airbag (22) includes a cushion area (24) extending along the side window (90) and at least partially covering the latter in the inflated state, comprising an upper securing edge (28) by which the cushion area (24) is secured to the lateral roof rail (18), and comprising a holding area (26) in the inflated state extending away from the side window (90) and from the cushion area (24) which constitutes the inner end of the side curtain airbag (22) and which is secured by its upper edge (29) to the vehicle roof (40) spaced apart from the lateral roof rail (18).

13 Claims, 4 Drawing Sheets

(56) References Cited

U.S. PATENT DOCUMENTS

| | | | |
|---|---|---|---|
| 8,020,888 B2* | 9/2011 | Cheal | B60R 21/213 |
| | | | 280/730.2 |
| 8,636,301 B1* | 1/2014 | Wang | B60R 21/2338 |
| | | | 280/730.2 |
| 8,899,617 B2* | 12/2014 | Fukawatase | B60R 21/233 |
| | | | 280/730.2 |
| 9,108,588 B2* | 8/2015 | Fukawatase | B60R 21/233 |
| 9,327,669 B2* | 5/2016 | Jaradi | B60R 21/08 |
| 9,487,180 B2* | 11/2016 | Nakashima | B60R 21/213 |
| 9,862,349 B2* | 1/2018 | Fujiwara | B60R 21/232 |
| 10,131,314 B2* | 11/2018 | Yoo | B60R 21/203 |
| 10,279,770 B2* | 5/2019 | Faruque | B60R 21/2342 |
| 10,315,609 B2* | 6/2019 | Thomas | B60R 21/2338 |
| 10,640,076 B2* | 5/2020 | Lee | B60R 21/233 |
| 10,682,974 B2* | 6/2020 | Thomas | B60R 21/23138 |
| 10,807,556 B2* | 10/2020 | Hill | B60R 21/232 |
| 10,836,340 B2* | 11/2020 | Obayashi | B60R 21/2338 |
| 10,960,842 B2* | 3/2021 | Shimizu | B60R 21/213 |
| 2007/0241544 A1 | 10/2007 | Ohrvall et al. | |
| 2008/0129023 A1 | 6/2008 | Heigl et al. | |
| 2009/0102169 A1 | 4/2009 | Gloeckler et al. | |
| 2015/0115581 A1 | 4/2015 | Mazanek et al. | |
| 2016/0280178 A1 | 9/2016 | Kruse | |
| 2021/0213906 A1* | 7/2021 | Jayakar | B60R 21/23138 |

* cited by examiner

SIDE IMPACT PROTECTION DEVICE

RELATED APPLICATIONS

This application corresponds to PCT/EP2019/066014, filed Jun. 18, 2019, which claims the benefit of German Application No. 10 2018 115 064.5, filed Jun. 22, 2018, the subject matter of which are incorporated herein by reference in their entirety.

BACKGROUND OF THE INVENTION

The invention relates to a side impact protection device comprising a curtain airbag, the airbag including a cushion area extending along the side window and at least partially covering the latter in the inflated state, comprising an upper securing edge by which the cushion area is secured to the lateral roof rail.

Said side curtain airbags are also referred to as curtain bags and partially completely cover a single side window or the side windows of occupants sitting in a row. Said side curtain airbags extend on the side of the heads of the occupants so as to offer sufficient protection in the case of side impact. Said very complex airbags have turned out to be an excellent supplement of front airbags in order to offer optimized protection to occupants.

SUMMARY OF THE INVENTION

It is the object of the invention to provide a side impact protection device that offers even more protection, especially in combination with a front airbag.

This is achieved by a side impact protection device comprising a side curtain airbag, the airbag having a cushion area extending along the side window and at least partially covering the latter in the inflated state, comprising an upper securing edge by which the cushion area is secured to the lateral roof rail, and an holding area in the inflated state extending away from the side window and from the cushion area which constitutes the inward end of the airbag and which is secured by its upper edge to the vehicle roof spaced apart from the lateral roof rail.

The previous cushion-type side curtain airbags have extended at most to the A pillar so as to prevent contact with the A pillar in the case of slight diagonal impact. At most the airbag was thickened in the area of the A pillar at the front edge extending diagonally downwards. The invention provides a different approach, as in this case the airbag extends, roughly speaking, in V-shape or L-shape in a top view, i.e. it has a leg projecting from the cushion area and partly extending in front of the occupants.

For this purpose, the inwardly extending leg (inwardly means in the direction of the longitudinal center axis of the vehicle, when viewed in a top view), viz. the so-called holding area, is secured once more separately on the roof itself, viz. spaced apart from the lateral roof rail.

Thus, the holding area does not constitute a thickened bead being secured exclusively to the lateral roof rail or to the A pillar but an airbag portion being secured directly in front of the occupant and not only laterally in front of the occupant. The holding area therefore provides that the occupant is prevented from contacting the A pillar in the case of diagonal impact but is restrained by the side curtain airbag between the holding area and the cushion area. This entails a further advantage: The corner structure formed by the cushion area and the holding area helps to guide the head of the occupant in a very clearly defined manner in the case of diagonal impact. It is another advantage that the head rotation of the vehicle occupant that may be caused by the contact with a front airbag in the case of diagonal impact is reduced.

Another reduction of the rotation of the head is achieved by the fact that in the inflated state, when viewed from the occupant, the airbag takes a shape tapering toward the dedicated A pillar which is formed by the cushion area and the holding area. In other words, the holding area does not project at right angles with the cushion area but forms sort of a holding funnel on the inside with the inside of the cushion area. The inner wall of the holding area, viz. the wall facing the vehicle tail, consequently extends starting from its vertically extending edge diagonally outwardly and forwardly. The restraint surface formed in this way enables the occupant impacting on the same to slide along the same diagonally outwardly and forwardly. Hence, there is no way for the head when immersing into the airbag "to get caught" on the same due to this friction force and to rotate due to the diagonal impact.

According to one embodiment, the airbag includes an intermediate portion joining the cushion area and the holding area which in the inflated state covers the A pillar at least in portions. Said intermediate portion may be, for example, the foremost portion of the airbag in the inflated state thereof.

The intermediate portion is formed, for instance, by a crease of the airbag. This means that, as compared to previous curtain bags, the airbag is lengthened. Its longitudinal extension would go beyond the A pillar, but the airbag is folded back in its front area (for mounting) and is provided with a crease (in the deployed state), wherein the area of the crease also is the overflow area between the cushion area and the holding area which are fluid-coupled to each other according to the invention.

Alternatively, the intermediate portion may be formed by a tube-shaped intermediate part which is defined especially by at least one separate pre-cut part associated with the intermediate part only. The intermediate part fluid-couples the cushion area to the holding area quasi like an overflow passage and may additionally act as a restraint area. In general, the intermediate part may be smaller in height in the inflated state than the directly adjacent portion of the cushion area and of the holding area.

For manufacturing the side curtain airbag, it may be sufficient according to a variant of the invention that each of the outer wall and the inner wall of the airbag individually or at least only the inner wall are/is formed by one single large pre-cut part. In this case, the inner wall is bent between the cushion area and the holding area.

As an alternative, the cushion area and the holding area may be formed by separate pre-cut parts which are connected in the area of the A pillar, i.e. are physically connected and in this area may also form an overflow area for gas.

In general, the side impact protection device according to the invention may include one or more inflators which are in fluid communication, for example, directly with the cushion area and/or directly with the holding area. This means that, for example, an inflator might be provided in the roof area in the vicinity of the securing point of the holding area and/or one or more inflators might be provided in the A pillar or in the lateral roof rail or in the B or C pillar so as to inflate the cushion area, where necessary also additionally the holding area.

The holding area is positioned in an especially stable manner when it is secured at a distance of at least 200 mm, measured horizontally and perpendicularly to the longitudinal vehicle axis, from the upper dedicated corner of the windscreen. Said securing point preferably may even be located at a distance of at least 300 mm from the corner. The extension inwardly in the direction of the vehicle center is thus sufficiently large for "catching" the head of the occupant in the case of diagonal impact. Thus, any contact with the front airbag either can be completely avoided or can be reduced. The position of the securing point in the longitudinal vehicle direction is not restricted to the front transversely extending roof rail (roof post). Rather, the securing point may be provided very variably in the roof zone, i.e. it may even be located behind the transversely extending roof rail.

One variant of the invention provides the securing point for the holding area to be located in the driving direction behind the folded-up sun visor at the vehicle roof. The holding area thus extends relatively closely to the occupant.

For the holding area to have as little overlap with the front airbag as possible, one embodiment of the invention provides a particular extension of the holding area. The holding area includes a vertically extending edge zone which in the inflated state faces the longitudinal center axis of the vehicle. Said vertically extending inside edge zone extends vertically from the securing point downwards and forwards as well as toward the dedicated A pillar. The holding area thus is not a substantially rectangular cushion but it can rather be conceived as an originally rectangular cushion which has a largely cut-out lower corner, however. In said corner there will be no contact with the occupant's head so that the missing corner has no influence whatsoever on the restraint effect. In addition, in said area the steering wheel and/or the front airbag may be located in the inflated state so that there are no overlaps in this area. This also offers a further advantage. In the case of a driver airbag, the latter just as the steering wheel may be differently positioned, especially differently closely to the occupant, by the steering wheel adjustment. This means that the disturbing contour formed by the steering wheel and the front airbag is variable. Due to the design of the holding area without the lower corner, said variability of the position of the front airbag and of the steering wheel cannot crucially influence the position of the holding area.

The holding area should position itself, in the inflated state, in front of the inflated front airbag, i.e. it should be contacted in the first place by the occupant.

Optionally, the holding area rests on the front airbag, when both of them are inflated.

Both of the cushion area and the holding area may be secured to the A pillar, especially to several points and thus along the A pillar to the same so as to optimize the position thereof.

As a matter of course, both the cushion area and the holding area may have additional beads as well as darts or tethers in their interior so as to optimize their shape.

Moreover, the cushion area may as well extend into the vehicle tail and in said area may be used to restrain the rear occupant in the case of side impact.

BRIEF DESCRIPTION OF THE DRAWINGS

Further features and advantages of the invention will be evident from the following description and from the following drawings which are referred to, wherein.

DETAILED DESCRIPTION OF THE INVENTION

Figure 1:
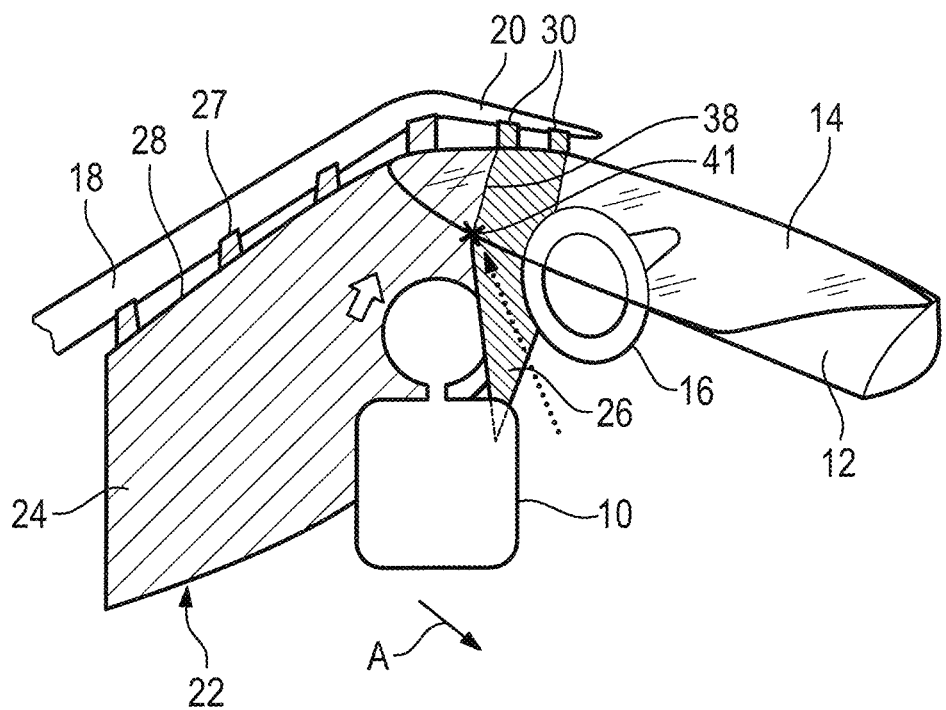
FIG. 1 shows a simplified perspective top view onto a first side impact protection device according to the invention in accordance with a first variant illustrated without the roof of the vehicle.

FIG. 1 illustrates a side impact protection device that efficiently protects the head of the occupant 10 both in the event of side impact and in the event of diagonal impact from ahead. There are shown very schematically the instrument panel 12 and the windscreen 14 as well as the steering wheel 16 of the respective vehicle.

Furthermore, a lateral roof rail 18 and an A pillar 20 are visible.

The side impact protection device comprises a side curtain airbag 22 which largely or completely covers at least the side window close to and associated with the occupant. The side curtain airbag 22 comprises for covering the side window a cushion area 24 which may also include darts or tethers as well as a so-called holding area 26 being fluid-communicated with said cushion area.

The cushion area 24 extends along the lateral roof rail 18 and along the side window forward in the direction of the A pillar and, at its upper securing edge 28, is arranged on the roof rail 18 via plural securing points 27. Optionally, also securing points 27 of the cushion area 24 may be provided on the A pillar 20.

The holding area 26 is in fluid communication with the cushion area 24 and extends away from the cushion area 24 and the side window in the arrow direction A toward the longitudinal center axis of the vehicle.

The holding area 26 is attached to the A pillar 20 via securing points 30 and from said securing points 30 extends, when viewed from the occupant 10, diagonally toward the latter and in the direction of the longitudinal center axis of the vehicle. The holding area 26, too, is cushion-shaped. In the inflated state the holding area 26 extends, as is evident from FIGS. 1 and 2, also in front of the steering wheel 16 and also in front of a possibly provided inflated front airbag 32 (cf. FIG. 2).

The side curtain airbag is V-shaped or L-shaped having tapering legs of the "L", when viewed in a top view.

Figure 2:
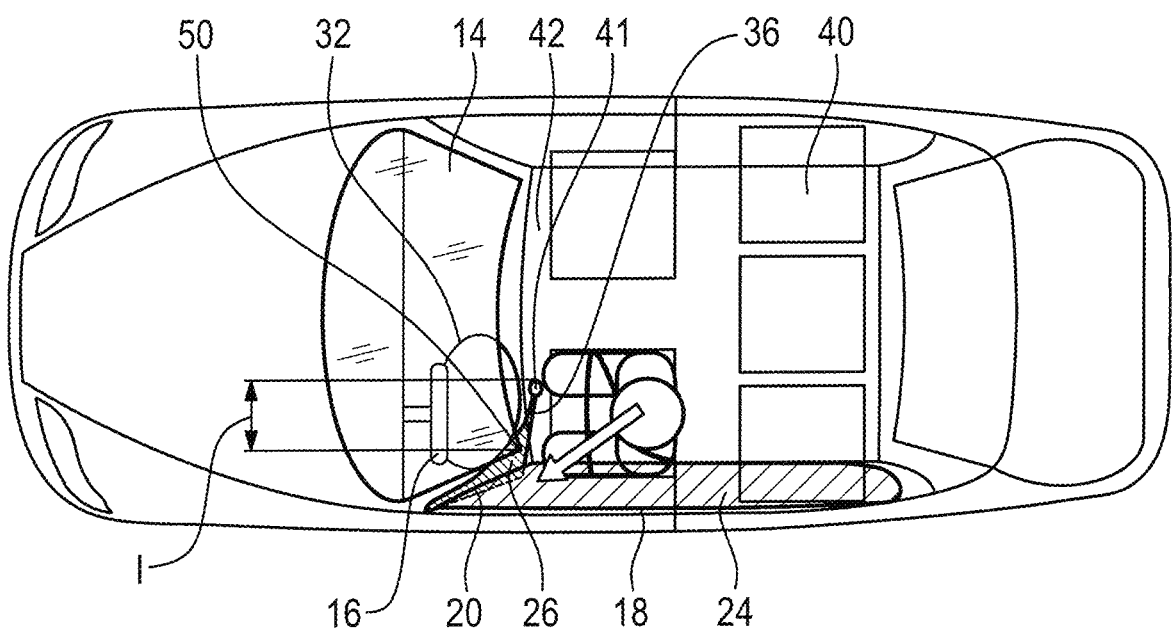
FIG. 2 shows the side impact protection device according to FIG. 1 in a top view onto the vehicle in the mounted and inflated state.
Figure 5:
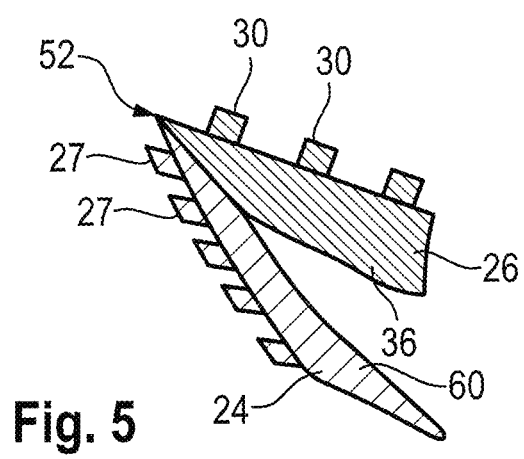
FIG. 5 shows a schematic view of the side curtain airbag of FIG. 3 in a top view and in the inflated state without illustrating parts of the vehicle.

The cushion area 24 and the holding area 26 therefore take a shape which is tapering toward the A pillar 20, when viewed from the occupant 10, (cf. also FIGS. 2 and 5). Since the inner wall 36 of the holding area 26 thus extends diagonally forwardly, the occupant's head may slide along the same and will be held in the corner between the holding area 26 and the cushion area 24, if the head swings so far forward at all.

As is evident from FIG. 2, the holding area 26 may also be supported by the front airbag 32 so that the airbags are abutting on each other. In any case, however, as already mentioned before, the holding area 26 is located ahead of the front airbag 32, when viewed from the occupant.

The stable position of the holding area 26 is very important. For this reason, the upper edge 38 (cf. FIG. 1) of the holding area 26 is secured to the vehicle roof 40 which is not visible in FIG. 1. In the embodiment according to FIG. 1, the securing point 41 is located spaced apart from the lateral roof rail 18 close to the front transversely extending roof rail or roof post 42.

FIG. 2 illustrates that the securing point 41 is located at a distance I of at least 200 mm, especially at least 300 mm measured horizontally and perpendicularly to the longitudinal vehicle axis distant from the upper dedicated corner 50 of the windscreen 14. The offset in the longitudinal vehicle direction is not taken into consideration in this measurement.

Figure 3:
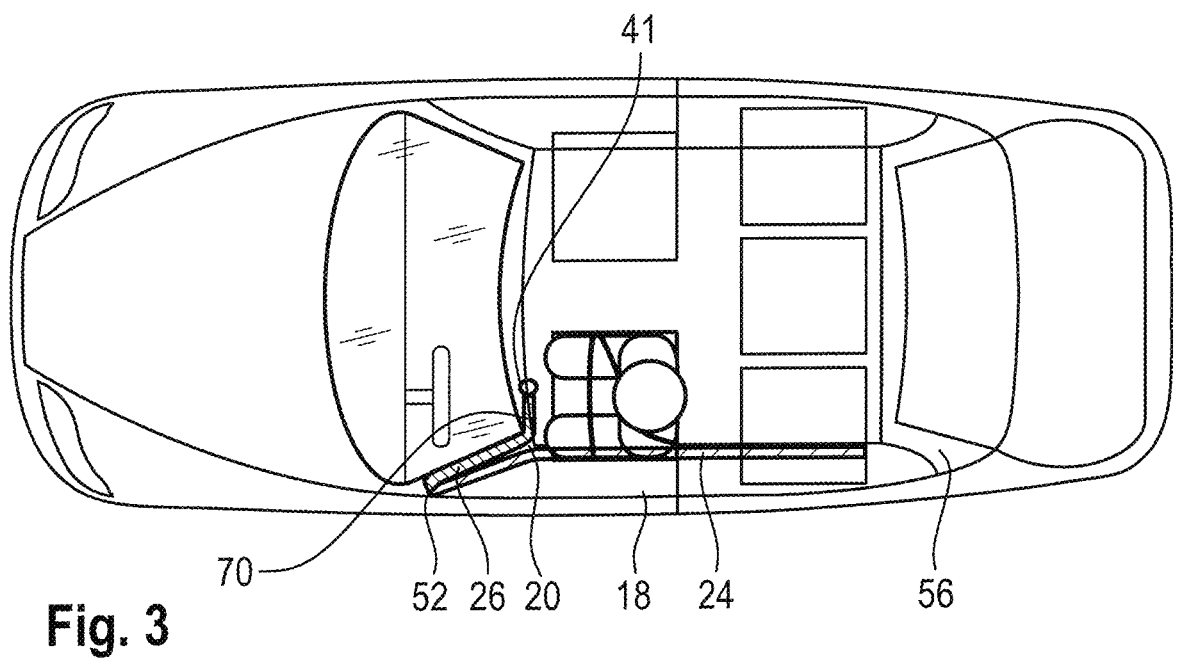
FIG. 3 shows a top view onto the side impact protection device according to the invention, e.g. according to FIG. 1 with a folded side curtain airbag in a top view onto the correspondingly equipped vehicle.
Figure 4:
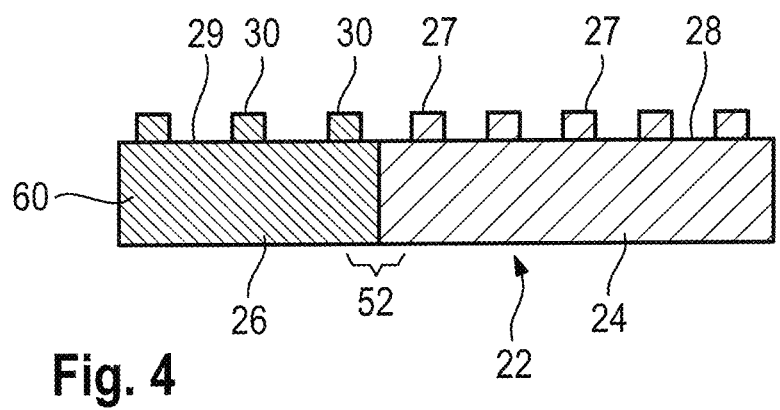
FIG. 4 shows a schematic side view of the spread and non-inflated side curtain airbag which is mounted in the embodiment according to FIG. 1.

FIGS. 3 and 4 illustrate the side airbag 22 in the non-inflated state, with FIG. 4 representing the flatly spread airbag quite schematically. In this embodiment, the side curtain airbag 22 is extra long in the spread state as compared to a previous side curtain airbag, i.e. lengthened by the holding area 26.

In the mounted state, the airbag 22 is reverted, or in other words, bent or folded in an intermediate portion 52 joining the cushion area 24 and the holding area 26. Consequently, the airbag extends along the lateral roof rail 18, starting from the C pillar 56 to the A pillar 20 (cf. FIG. 3) and downwards along the latter so as to have the intermediate portion 52 at the deepest point. After that, the holding area 26 extends upwards along the A pillar 20 and then in a bent or slightly folded shape inwards (i.e. toward the longitudinal center axis of the vehicle), for example along the front roof post 42 up to the securing point 41 where its inner end 70 is located.

The intermediate portion 52 shown in FIG. 5 connects the cushion area 24 with the holding area 26 also in terms of fluid.

Optionally, which is neither limiting nor limited to any of the embodiments, the inner wall 60 of the cushion area 24 and the inner wall 36 of the holding area 26 may consist, just as the opposite outer wall, of a joint one-piece pre-cut part, which facilitates manufacture. As an alternative, the inner wall and/or the outer wall of the airbag may as well be composed of plural parts.

In FIG. 5, the V shape of the inflated airbag in the area of the A pillar, which is not shown for the purpose of simplification, is clearly evident.

The embodiment according to FIGS. 6 to 8 functionally corresponds largely to the afore-described embodiment so that in the following only the differences shall be discussed.

Figure 6:
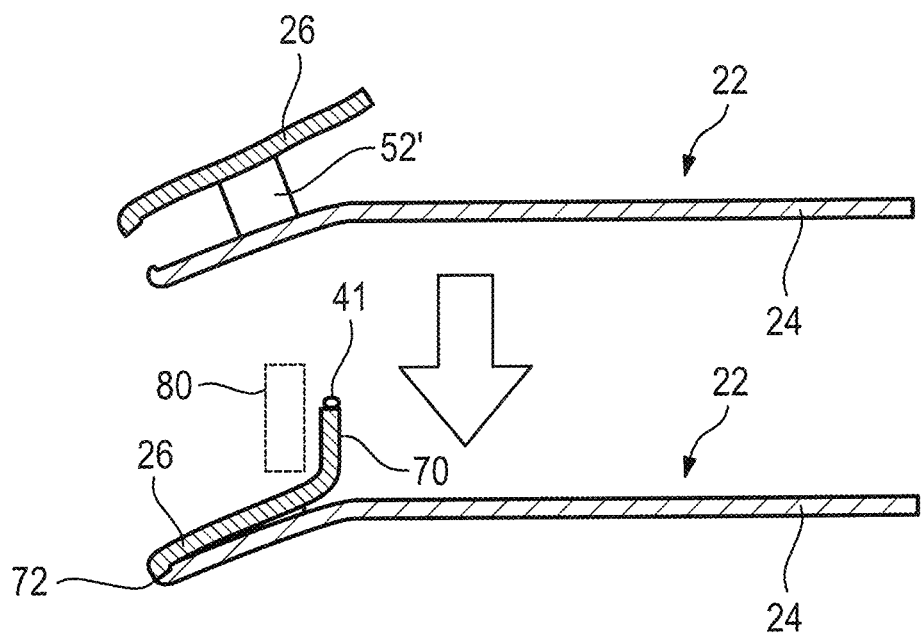
FIG. 6 shows a top view onto the folded side curtain airbag of a second embodiment of the side impact protection device according to the invention comprising a non-folded, extended intermediate part (upper view) and comprising a folded intermediate part (lower view)

As is visible at the top of FIG. 6, there is an intermediate portion 52' between the cushion area 24 and the holding area 26 which acts as a tube-shaped connection between the two areas and which may be made from a separate pre-cut part. Via said tube-shaped intermediate portion 52' then the gas flows to the holding area 26, if compressed gas flows directly into the cushion area 24 only.

In the area of its front ends, the cushion area 24 and the holding area 26 may be either closed and separated from each other, as shown at the top of FIG. 6, or else may be additionally mechanically connected, possibly also fluid-communicated.

In the shown exemplary embodiment, the intermediate portion 52' between the cushion area 24 and the holding area 26 is folded, and the inner end 70 of the airbag is formed by bending or kinking the holding area 26, just as in the first embodiment. The front ends of the cushion area 24 and the holding area 26 then may be secured to each other in the portion 72 constituting the foremost end of the mounted airbag 22, as is shown by seams 74 by way of FIG. 8.

Figure 7:
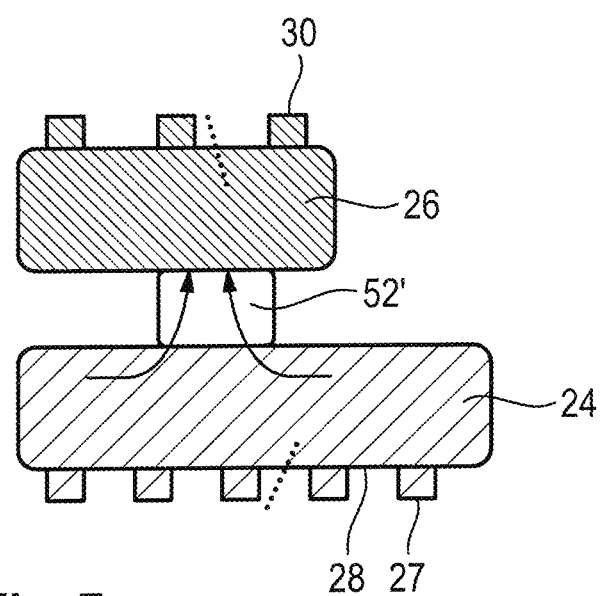
FIG. 7 shows a partial cutout of the side curtain airbag of FIG. 6 in the inflated state.
Figure 8:
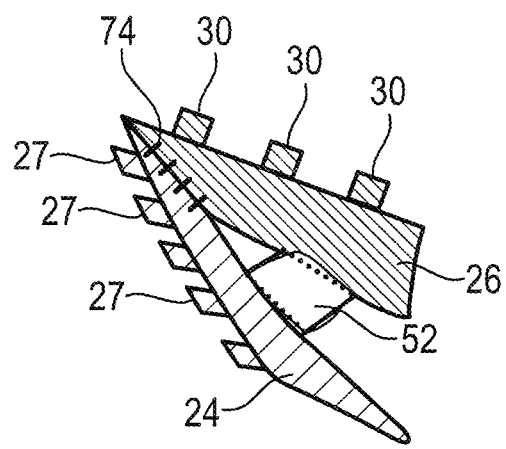
FIG. 8 shows a schematic top view onto the inflated side curtain airbag according to FIG. 6 in the area of the A pillar.

In the case of restraint, gas flows, as symbolically depicted in FIG. 7, from the cushion area 24 via the intermediate portion 52' into the equally cushion-shaped holding area 26. As is evident from the Figures, the intermediate portion 52' in the inflated state has a lower vertical height than the directly adjacent portions of the cushion area 24 and of the holding area 26, i.e. it constitutes a bottleneck.

It is true for all embodiments that the securing point 41 optionally may be located behind the folded sun visor 80 (cf. FIG. 6), thus the holding area 26 extends along the roof inwardly behind the sun visor mounting.

Figure 9:
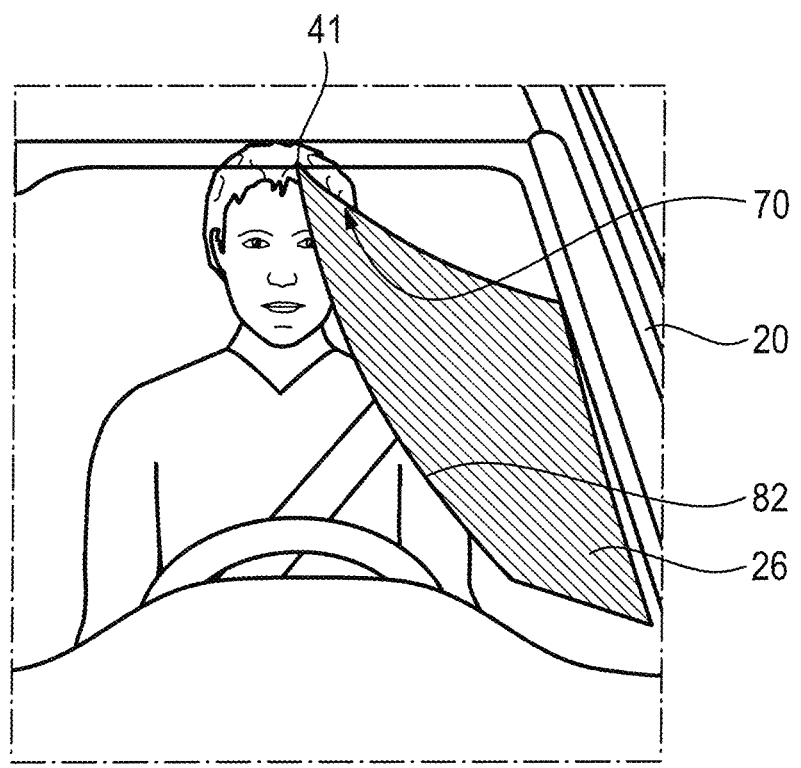
FIG. 9 shows a front view of the side impact protection device according to the invention including the vehicle with a dummy in the inflated state of the holding area.

In FIG. 9, the holding area 26 is symbolically visible from the front, said configuration being optional. In the embodiment according to FIG. 9, the inside vertical edge zone 82 which in the inflated state faces the opposite side window (not shown) extends forwards as well as diagonally downwards to the dedicated A pillar 20 from the upper inner end 70, in this case starting from the securing point 41.

As is also evident from FIG. 9, the securing point 41 for the holding area 26 is located in the area of the middle of the seat of the associated occupant.

The invention claimed is:

1. A side impact protection device for a vehicle, comprising a side curtain airbag (22), wherein the side curtain airbag (22) includes a cushion area (24) extending along a side window (90) and at least partially covering the side window in an inflated state, wherein the side curtain airbag (22) comprises an upper securing edge (28) by which the cushion area (24) is secured to a lateral roof rail (18)$_1$ and wherein the side curtain airbag (22) comprises a holding area (26) in the inflated state extending away from the side window (90) and from the cushion area (24) which holding area (26) constitutes an inner end of the side curtain airbag (22) and is secured by its upper edge (29) to a vehicle roof (40) spaced apart from the lateral roof rail (18), and wherein the side curtain airbag (22) in a folded state extends along the lateral roof rail (18) and downwards along an A pillar (20) of the vehicle and the holding area (26) then extends upwards from the A pillar (20) again and finally inwards along the vehicle roof (41) up to a securing point (41).

2. The side impact protection device according to claim 1, wherein in the inflated state the side curtain airbag (22), which is formed by the cushion area (24) and the holding area (26), takes a shape tapering toward the A pillar (20).

3. The side impact protection device according to claim 1, wherein the side curtain airbag (22) includes an intermediate portion (52, 52') joining the cushion area (24) and the holding area (26) which in the inflated state covers the A pillar (20) at least in portions.

4. The side impact protection device according to claim 3, wherein the intermediate portion (52) is formed by a kink of the side curtain airbag (22).

5. The side impact protection device according to claim 3, wherein the intermediate portion (52') is formed by a tube-shaped gas-conveying intermediate part which is defined by at least one separate pre-cut part associated with the intermediate part only.

6. The side impact protection device according to claim 5, wherein the intermediate part in the inflated state has a smaller vertical height than directly adjacent portions of the cushion area (24) and of the holding area (26).

7. The side impact protection device according to claim 1, wherein the side curtain airbag (22) includes an outer wall and an inner wall (36, 60), at least the inner wall (36, 60) being formed by one single pre-cut part.

8. The side impact protection device according to claim 1, wherein the cushion area (24) and the holding area (26) are formed by separate pre-cut parts and are joined in an area of the A pillar (20) where they optionally form an overflow area.

9. The side impact protection device according to claim 1, wherein the holding area (26) is secured to the vehicle roof (40) at a distance of at least 200 mm, measured horizontally and perpendicularly to a longitudinal vehicle axis, from an upper dedicated cover (50) of a windscreen (14).

10. The side impact protection device according to claim 1, wherein the holding area (26) is secured to the vehicle roof (40) in a longitudinal vehicle direction behind a folded sun visor (80).

11. The side impact protection device according to claim 1, wherein the holding area (26) includes a vertically extending edge zone (82) which in the inflated state faces a longitudinal center axis of the vehicle, wherein the vertically extending edge zone (82) extends from the securing point (41) of the holding area (26) forwards as well as diagonally downwards to the A pillar (20).

12. The side impact protection device according to claim 1, wherein in the inflated state the holding area (26) overlies an inflated front airbag (32).

13. The side impact protection device according to any one of the preceding claims claim 1, wherein the cushion area (24) and the holding area (26) are secured to the A pillar (20).

* * * * *